(12) United States Patent
Wen et al.

(10) Patent No.: US 12,513,606 B2
(45) Date of Patent: Dec. 30, 2025

(54) CELL SELECTION OR RESELECTION METHOD AND DEVICE

(71) Applicant: VIVO MOBILE COMMUNICATION CO., LTD., Guangdong (CN)

(72) Inventors: Ming Wen, Guangdong (CN); Kimba Dit Adamou Boubacar, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 552 days.

(21) Appl. No.: 17/949,884

(22) Filed: Sep. 21, 2022

(65) Prior Publication Data

US 2023/0016053 A1 Jan. 19, 2023

Related U.S. Application Data

(63) Continuation of application No. PCT/CN2021/085160, filed on Apr. 2, 2021.

(30) Foreign Application Priority Data

Apr. 2, 2020 (CN) .......................... 202010256788.8

(51) Int. Cl.
*H04W 48/16* (2009.01)
*H04W 36/00* (2009.01)
(Continued)

(52) U.S. Cl.
CPC ....... *H04W 48/16* (2013.01); *H04W 36/0061* (2013.01); *H04W 48/18* (2013.01); *H04W 48/20* (2013.01)

(58) Field of Classification Search
None
See application file for complete search history.

(56) References Cited

U.S. PATENT DOCUMENTS

| 2018/0324645 | A1 | 11/2018 | Park et al. | |
| 2022/0346002 | A1* | 10/2022 | Fu | H04W 48/20 |
| 2023/0037553 | A1* | 2/2023 | Shih | H04W 36/13 |

FOREIGN PATENT DOCUMENTS

| CN | 106851589 A | 6/2017 |
| CN | 107223350 A | 9/2017 |

(Continued)

OTHER PUBLICATIONS

Xiaomi, "Cell Selection and Reselection Consideration for Network Slicing", 3GPP TSG-RAN WG2 #97 bis R2-1702530, Apr. 3-7, 2017 (Apr. 3-7, 2017), 4 pgs.

(Continued)

*Primary Examiner* — Christine T Duong
(74) *Attorney, Agent, or Firm* — Fredrikson & Byron, P.A.

(57) ABSTRACT

Embodiments of the present disclosure disclose a cell selection or reselection method and a device, to resolve a problem that a terminal device cannot effectively and rapidly access a cell without taking a slice of the cell into consideration when performing cell selection or reselection. The method may be performed by a terminal device, and includes: receiving a MIB message from a cell; in a case of determining, based on the MIB message, that the cell can be a candidate access cell, reading a SIB message of the cell, where the SIB message includes slice information of the cell; and selecting one slice from slices of the cell to access based on slice information supported by the terminal device and the slice information of the cell.

20 Claims, 3 Drawing Sheets

(51) Int. Cl.
*H04W 48/18* (2009.01)
*H04W 48/20* (2009.01)

(56) References Cited

FOREIGN PATENT DOCUMENTS

| CN | 107295609 A | 10/2017 |
|---|---|---|
| CN | 110602731 A | 12/2019 |
| CN | 110741684 A | 1/2020 |
| EP | 3618562 A1 | 3/2020 |
| EP | 4084527 A1 | 11/2022 |
| WO | 2018219352 A1 | 12/2018 |
| WO | 2021018519 A1 | 2/2021 |

OTHER PUBLICATIONS

Xiaomi, "Visibility of Slicing to UE", 3GPP TSG-RAN WG2 #97 bis R2-1702529, Apr. 3-7, 2017 (Apr. 3-7, 2017), 5 pgs.

ZTE Corporation et al., "Leftover issues for NW slicing" 3GPP TSG-RAN WG2 Meeting #99 bis R2-1710422, Oct. 13, 2017 (Oct. 13, 2017) 5 pgs.

VIVO et al., "Single cellBarred IE in NR System Information", 3GPP TSG-RAN WG2 Meeting #101 R2-1802088, Feb. 26, 2018 Mar. 2, 2018 (Feb. 26, 2018 to Mar. 2, 2018), 2 pgs.

International Patent Application No. PCT/CN2021/085160, International Search Report and Written Opinion with Partial English Machine Translation mailed Jun. 29, 2021, 9 pages.

CATT "Cell selection and re-selection based on slice" 3GPP TSG-RAN WG2 #99, Berlin, Germany, Aug. 21-25, 2017, pp. 2.

Samsung "Idle mobility aspects to support network slicing" 3GPP TSG-RAN WG2 NR #99 Meeting, Berlin, Germany, Aug. 21-25, 2017, pp. 4.

VIVO "Cell selection / reselection with network slicing" 3GPP TSG-RAN WG2 Meeting #99, Berlin, Germany, Aug. 21-25, 2017, pp. 3.

\* cited by examiner

CELL SELECTION OR RESELECTION METHOD AND DEVICE

CROSS-REFERENCE

This application is a continuation of International Application No. PCT/CN2021/085160, filed on Apr. 2, 2021, which claims priority to Chinese Patent Application No. 202010256788.8, filed with the Chinese Patent Office on Apr. 2, 2020 and entitled "CELL SELECTION OR RESELECTION METHOD AND DEVICE", which is incorporated herein by reference in its entirety.

TECHNICAL FIELD

Embodiments of the present disclosure relate to the communications field, and in particular, to a cell selection or reselection method and device.

BACKGROUND

One hardware infrastructure may be segmented into multiple "virtual" end-to-end networks by using a network slice (slice) technology. Each virtual network obtained through segmentation is logically completely isolated from a terminal device to an access network, from an access network to a core network, and from a core network to a transport network, and adapts to technical requirements of respective services.

Due to a fully "customizable" feature, the network slice technology provides operators with extensive industry application space. In addition, for an upper-layer application service provider, the network slice technology may also be used to provide a more personalized service.

However, in a related technology, when performing cell selection or reselection, a terminal device does not take a slice of a cell into consideration, and if this mechanism is missing, the terminal device cannot effectively and quickly access the cell. Therefore, it is necessary to provide a fast cell selection and access mechanism.

SUMMARY

Embodiments of the present disclosure provide a cell selection or reselection method and a device.

According to a first aspect of the present disclosure, a cell selection or reselection method is provided. The method is performed by a terminal device, and the method includes: receiving a MIB message from a cell; in a case of determining, based on the MIB message, that the cell can be a candidate access cell, reading a SIB message of the cell, where the SIB message includes slice (which is referred to as a slice subsequently) information of the cell; and selecting one slice from slices of the cell to access based on slice information supported by the terminal device and the slice information of the cell.

According to a second aspect of the present disclosure, a cell selection or reselection method is provided. The method is performed by a network device, and the method includes: sending a system message, where the system message includes a MIB message and a SIB message, and the SIB message includes slice information of a cell; where the slice information of the cell is used by a terminal device to select one slice from slices of the cell to access based on slice information supported by the terminal device and the slice information of the cell.

According to a third aspect of the present disclosure, a terminal device is provided. The terminal device includes: a receiving module, configured to receive a MIB message from a cell; a reading module, configured to: in a case of determining, based on the MIB message, that the cell can be a candidate access cell, read a SIB message of the cell, where the SIB message includes slice information of the cell; and an access module, configured to select one slice from slices of the cell to access based on slice information supported by the terminal device and the slice information of the cell.

According to a fourth aspect of the present disclosure, a network device is provided. The network device includes: a sending module, configured to send a system message, where the system message includes a MIB message and a SIB message, and the SIB message includes slice information of a cell; where the slice information of the cell is used by a terminal device to select one slice from slices of the cell to access based on slice information supported by the terminal device and the slice information of the cell.

According to a fifth aspect of the present disclosure, a terminal device is provided, and the terminal device includes a processor, a memory, and a computer program that is stored in the memory and that can run on the processor, and when the computer program is executed by the processor, steps of the cell selection or reselection method provided in the first aspect are implemented.

According to a sixth aspect of the present disclosure, a network device is provided, and the network device includes a processor, a memory, and a computer program that is stored in the memory and that can run on the processor, and when the computer program is executed by the processor, the cell selection or reselection method provided in the second aspect is implemented.

According to a seventh aspect of the present disclosure, a computer-readable storage medium is provided, and a computer program is stored in the computer-readable storage medium. When the computer program is executed by a processor, steps of the cell selection or reselection method provided in either of the first aspect and the second aspect are implemented.

In the embodiments of the present disclosure, a SIB message of a cell includes slice information of the cell. In a case of determining, based on the MIB message, that the cell can be a candidate access cell, a terminal device may read the SIB message, and select one slice from slices of the cell to access based on slice information supported by the terminal device and the slice information of the cell. In the embodiments of the present disclosure, the terminal device may directly select a slice that is supported by the terminal device and that is available to the cell to access, to effectively and rapidly access the cell.

BRIEF DESCRIPTION OF DRAWINGS

The accompanying drawings described herein are used to provide further understanding of this application and constitute a part of this application. The exemplary embodiments of this application and descriptions thereof are used to explain this application, and do not constitute an undue limitation on this application. In the accompanying drawings.

DESCRIPTION OF EMBODIMENTS

Figure 1:
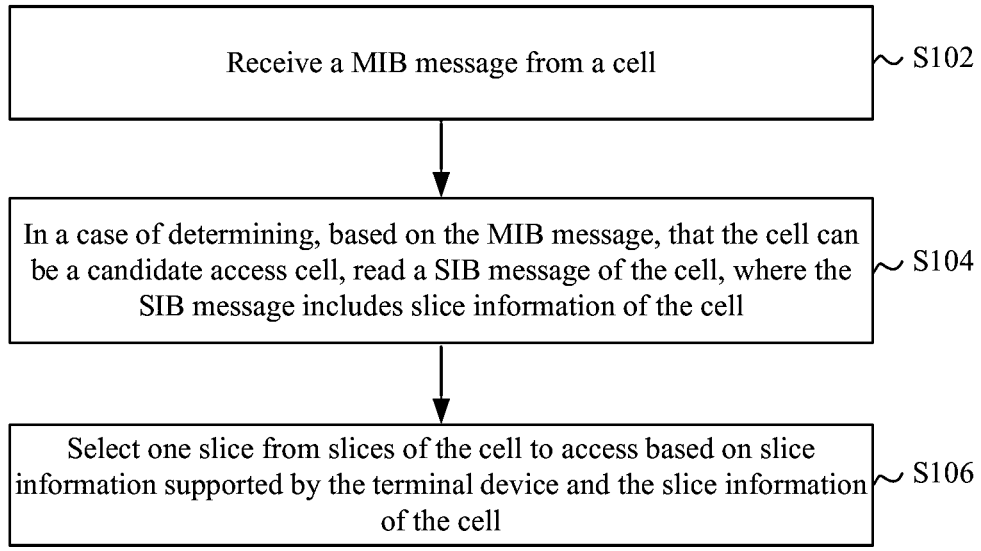
FIG. 1 is a schematic flowchart of a cell selection or reselection method according to an embodiment of the present disclosure.

To make the objects, technical solutions, and advantages of this application clearer, the following clearly describes the technical solutions of this application with reference to specific embodiments of this application and corresponding accompanying drawings. Apparently, the described embodiments are only some rather than all embodiments of this application. Based on the embodiments of this application, all other embodiments obtained by a person of ordinary skill in the art without creative efforts fall within the protection scope of this application. "And/or" in the embodiments of this specification represents at least one of two.

It should be understood that the technical solutions in the embodiments of the present disclosure may be applied to various communications systems, for example, a Long Term Evolution (Long Term Evolution, LTE) system, an LTE frequency division duplex (Frequency Division Duplex, FDD) system, an LTE time division duplex (Time Division Duplex, TDD) system, a universal mobile telecommunication system (Universal Mobile Telecommunication System, UMTS) or worldwide interoperability for microwave access (Worldwide Interoperability for Microwave Access, WiMAX) communications system, a 5G system, a New Radio (New Radio, NR) system, or a subsequent evolved communications system.

In the embodiments of the present disclosure, the terminal device may include but is not limited to a mobile station (Mobile Station, MS), a mobile terminal (Mobile Terminal), a mobile telephone (Mobile Telephone), user equipment (User Equipment, UE), a handset (handset), portable equipment (portable equipment), a vehicle (vehicle), and the like. The terminal device may communicate with one or more core networks by using a radio access network (Radio Access Network, RAN). For example, the terminal device may be a mobile phone (or referred to as a "cellular" phone) or a computer with a wireless communication function, or the terminal device may be a portable, pocket-sized, handheld, computer built-in, or vehicle mobile apparatus.

In this embodiment of the present disclosure, a network device is an apparatus deployed in a radio access network to provide a wireless communication function for a terminal device. The network device may be a base station, and the base station may include various forms of macro base stations, micro base stations, relay stations, access points, and the like. In a system in which different radio access technologies are used, names of devices with base station functions may be different. For example, in an LTE network, the device is referred to as an evolved NodeB (Evolved NodeB, eNB or eNodeB); in a third generation (3rd Generation, 3G) network, the device is referred to as a NodeB (NodeB); in a 5G system, the device is referred to as a next generation NodeB (gNB), or a network device in a subsequent evolved communications system. However, words do not constitute a limitation.

In a related technology, there is no mechanism for supporting the terminal device in selecting and reselecting a cell based on a slice. Due to a lack of such a mechanism, the terminal device cannot effectively and quickly access the cell. After the terminal device accesses the cell, the terminal device needs to frequently perform handover, and cannot complete cell selection or reselection until the terminal device hands over to a cell and a slice in the cell is a type that can be supported by the terminal device.

To resolve the foregoing technical problem, an embodiment of the present disclosure provides a cell selection or reselection method, so that the terminal device can quickly implement "slice-based cell selection or reselection".

As shown in FIG. 1, an embodiment of the present disclosure provides a cell selection or reselection method 100. The method may be performed by a terminal device. In other words, the method may be performed by software or hardware installed in the terminal device. The method includes the following steps.

S102: Receive a master information block (Master Information Block, MIB) message from a cell.

S104: In a case of determining, based on the MIB message, that the cell can be a candidate access cell, read a system information block (System Information Block, SIB) message of the cell, where the SIB message includes slice (referred to as a slice subsequently) information of the cell.

In this embodiment, the slice information of the cell in the SIB message may include information used to indicate whether the slice is supported. If the information used to indicate whether the slice is supported is that the slice is supported, the slice information of the cell may further include identification information of the supported slice. The identification information of the slice may include at least one of the following: a slice identifier (ID), a slice type (type), a tenant type, a tenant identifier, a network function identifier, or the like. In specific implementation, existence of the identification information of the slice may be used to notify the terminal device that the cell supports the slice.

Optionally, in an embodiment, determining that the cell can be a candidate access cell in this step includes at least one of the following: determining, based on the MIB message, that a cell status indicator of the cell is "not barred"; and the MIB message includes an identifier of the slice supported by the terminal device.

In a specific example, determining that the cell can be a candidate access cell in this step includes: a "cell status" indicator in the MIB message is "not barred" (not barred), or a "cell status" indicator in the SIB message is "not reserved for operator use" ("not reserved" for operator use) and "not true for other use" ("not true" for other use).

In another specific example, determining that the cell can be a candidate access cell in this step includes: the MIB message of the cell includes information used to indicate the slice supported by the cell, where the slice information mentioned herein may be information that uniquely identifies the slice, such as an ID of the slice. When the terminal device reads, from the MIB message, the slice supported by the terminal device, the terminal device continues to read the SIB message of the cell. In another example, when the terminal device does not read, from the MIB message, the slice supported by the terminal device, the terminal device does not read the SIB message of the cell any longer, and gives up accessing the cell.

In this example, if the terminal supports reading MIB messages of multiple cells at the same time, the terminal device may roughly determine, based on the MIB messages of the multiple cells, which cell to access, that is, the terminal device may read only the MIB message to determine whether to select a cell to access, so that the terminal device can effectively and quickly access the cell. Certainly, in another example, if the slice information is carried only in the SIB message, the terminal device may continue to read the SIB message, to read the slice information of the cell.

In still another specific example, determining that the cell can be a candidate access cell in this step includes: determining, based on the MIB message, that a cell status indicator of the cell is "not barred", a "cell status" indicator in the SIB message is "not reserved for operator use" and "not true for other use", and the MIB message includes the identifier of the slice supported by the terminal device.

S106: Select one slice from slices of the cell to access based on slice information supported by the terminal device and the slice information of the cell.

In this step, the terminal device may identify, from the slice information of the cell, one or more pieces of slice information that are supported by the terminal device and that are available to the cell: If one slice is identified, the terminal device may directly select the slice to access; if multiple slices are identified, the terminal device may select one slice from the multiple slices to access, for example, one slice is randomly selected from the multiple slices to access, or a slice with a highest priority is selected based on priorities of the multiple slices. In this example, priorities are separately set for multiple slices of the cell, and the priority (information) may be obtained by reading the SIB message.

In the cell selection or reselection method provided in this embodiment of the present disclosure, a SIB message of a cell includes slice information of the cell. In a case of determining, based on the MIB message, that the cell can be a candidate access cell, the terminal device may read the SIB message, and select one slice from slices of the cell to access based on slice information supported by the terminal device and the slice information of the cell. In this embodiment of the present disclosure, the terminal device may directly select a slice that is supported by the terminal device and that is available to the cell to access, to effectively and rapidly access the cell.

As mentioned in Embodiment 100, the SIB message of the cell includes the slice information of the cell. In a specific embodiment, the SIB message of the cell includes at least one of the following (1) and (2).

(1) Information about one or more slices in the cell that can be camped on, where one piece of slice information (which may be any one of multiple pieces of slice information) corresponds to one or more pieces of frequency information.

(2) Information about one or more frequencies (frequency) in the cell that can be camped on, where one piece of frequency information (which may be any one of multiple pieces of frequency information) corresponds to one or more pieces of slice information.

Optionally, the frequency information includes at least one of the following: frequency information of a same radio access technology (RAT), or frequency information of different RATs. In other words, the foregoing frequency information may all be in a same RAT, may include multiple pieces of frequency information in different RATs, or may include multiple pieces of frequency information in a first RAT and multiple pieces of frequency information in a second RAT.

Optionally, the slice information is carried in at least one of the following forms: being carried in a form of bit, or being carried in a form of bitmap (bitmap).

Alternatively, for example, when the slice information is carried in a form of bit, the slice may be encoded by using M bits, and coding of each M bits represents a unique slice. Alternatively, when the slice information is carried in a form of bitmap, all slices supported by the cell may be pre-sorted to form a form of map, and "1" and "0" are used to indicate whether the slice is available.

In the foregoing embodiment, the slice information and the frequency information are bound. In this way, reading the SIB information of the cell in S102 in Embodiment 100 may be: reading available slice information of a public land mobile network (Public Land Mobile Network, PLMN) supported by the terminal device in the cell.

In this example, because different operators support different slices, the terminal device selects a slice corresponding to a PLMN that can be supported by the terminal device. Alternatively, the terminal device may first select a slice, and then select appropriate frequency information from one or more pieces of frequency information corresponding to the slice. Alternatively, the terminal device may first select frequency information, and then select an appropriate slice (that is, a slice that is supported by the terminal device and that is available to the cell) from one or more slices corresponding to the frequency information.

As mentioned in Embodiment 100, the SIB message of the cell includes the slice information of the cell. In a specific embodiment, a priority is further set for the slice information of the cell.

In a case that a priority is set for the slice information of the cell, S106 in Embodiment 100 may be: selecting one slice from the slices of the cell based on the slice information supported by the terminal device, the slice information of the cell, and the priority corresponding to the slice information of the cell.

In step S106, alternatively, for example, when the terminal device supports multiple slices that are available to the cell, a slice with a highest priority is selected from the multiple cells to access.

A cell selection process is described in the foregoing embodiments. In another embodiment, when the terminal device performs cell reselection, if a received radio resource control release (RRC release) message carries dedicated slice information of the terminal device, the terminal device reselects a slice of the cell based on the dedicated slice information.

In this embodiment, the network device may switch the terminal device to a dedicated slice based on subscription information of the terminal device.

Optionally, the dedicated slice information includes at least one of the following (1) to (3).

(1) Information about a reselected cell, for example, an identifier (ID) of the reselected cell.

(2) Information about one or more slices in the reselected cell that can be camped on, where one piece of slice information (which may be any one of multiple pieces of slice information) may correspond to one or more pieces of frequency information.

(3) Information about one or more frequencies in the reselected cell that can be camped on, where one piece of frequency information (which may be any one of multiple pieces of frequency information) may correspond to one or more pieces of slice information.

Optionally, the frequency information includes at least one of the following: frequency information of a same RAT, or frequency information of different RATs. In other words, the foregoing frequency information may all be in a same RAT, may include multiple pieces of frequency information in different RATs, or may include multiple pieces of frequency information in a first RAT and multiple pieces of frequency information in a second RAT.

Optionally, the slice information of the reselected cell is carried in at least one of the following forms: being carried in a form of bit, or being carried in a form of bitmap (bitmap).

Alternatively, for example, when the slice information is carried in a form of bit, the slice may be encoded by using M bits, and coding of each M bits represents a unique slice. Alternatively, when the slice information is carried in the form of bitmap, all slices supported by the cell may be pre-sorted to form a form of map, and "1" and "0" are used to indicate whether the slice is available.

To describe in detail the cell selection or reselection method provided in the foregoing embodiments of the present disclosure, two specific embodiments are used below for description.

Embodiment 1

A cell selection process of a terminal device is mainly described in Embodiment 1. This embodiment includes the following steps.

Step 1: When performing cell selection, the terminal device may first read a system message from a cell, where the system message includes a MIB message and a SIB message, and at least one of the following two steps is performed. In other words, only step 1.1 may be performed; only step 1.2 may be performed; or both step 1.1 and step 1.2 may be performed. A sequence of step 1.1 and step 1.2 in this embodiment is not limited.

Step 1.1: The terminal device parses the MIB message and the SIB message, where a "cell status" indicator in the MIB message is "not barred" (not barred), and a "cell status" indicator in the SIB message is "not reserved for operator use" ("not reserved" for operator use) and "not true for other use" ("not true" for other use), indicating that a current cell can be considered as a candidate cell.

Step 1.2: The MIB message of the cell indicates all slice information supported by the cell, and the terminal device supports reading MIB messages of multiple cells at the same time. Two steps (a) and (b) are performed.

(a) In this case, the terminal device first reads MIB messages of different cells, and slice information in the MIB messages includes the following two carrying forms (bits or bitmap):

TABLE 1

Slice information in a MIB message in a form of bit

| Cell 1 | Slice 1 ID | Cell 2 | Slice 2 ID |
|        | Slice 2 ID |        | Slice 4 ID |
|        | Slice 3 ID |        | Slice 5 ID |
|        | Slice 4 ID |        | Slice 8 ID |

In this embodiment, the slice information may be carried in a form of bit, as shown in Table 1. Assuming that 4 bits are used to represent an ID of the slice, slice 1 may be represented as 0001, slice 2 may be represented as 0010, and so on.

Table 1 shows that a MIB messages from cell 1 indicate that slices supported by cell 1 include: Slice 1, Slice 2, Slice 3, and Slice 4, and a MIB messages from cell 2 indicate that slices supported by cell 2 include: Slice 2, Slice 4, Slice 5, and Slice 8.

TABLE 2

Slice information in a MIB message in a form of bitmap

| Cell 1 | 0 (Slice 1) | Cell 2 | 1 (Slice 1) |
|        | 0 (Slice 2) |        | 1 (Slice 2) |
|        | 1 (Slice 3) |        | 0 (Slice 3) |
|        | 0 (Slice 4) |        | 0 (Slice 4) |
|        | 0 (Slice 5) |        | 0 (Slice 5) |
|        | 1 (Slice 6) |        | 0 (Slice 6) |
|        | 1 (Slice 7) |        | 1 (Slice 7) |
|        | 0 (Slice 8) |        | 0 (Slice 8) |

Optionally, in this embodiment, the slice information may alternatively be carried in a form of bitmap, as shown in Table 2. It is assumed that cell 1 and cell 2 support a total of eight slices, where a bitmap in a MIB message from cell 1 is 0010 0110. "1" indicates that the slice is available, and "0" indicates that the slice is unavailable, that is, available slices in cell 1 include Slice 3, Slice 6, and Slice 7. A bitmap in a MIB message from cell 2 is 1100 0010. "1" indicates that the slice is available, and "0" indicates that the slice is unavailable, that is, available slices in cell 2 include Slice 1, Slice 2, and Slice 7.

(b) In this embodiment, it is assumed that slice information in the MIB message is carried in a form of bitmap. In addition, if slices supported by the terminal device are slice 1 and slice 2, the terminal device selects cell 2 to access, and continues to read a SIB message of cell 2.

Step 2: The terminal device continues to read the SIB message of cell 2.

Available slice information that is of a PLMN supported by the terminal device and that is read by the terminal device is as follows:

(a) (One or more pieces of) slice information, where each slice corresponds to one or more pieces of frequency information.

i. The slice information is carried in a form of bit in the SIB message, as shown in Table 3.

Assuming that 4 bits are used to represent an ID of the slice, slice 1 may be represented as 0001, slice 2 is 0010, and so on.

ii. Optionally, different priorities may be allocated to the slice information (as shown in the second column in Table 3).

TABLE 3

One-to-many relationship between frequency and slice in a form of bit

| Slice 1 ID | Priority 1 | Frequency 1 |
|            |            | Frequency 2 |
| Slice 2 ID | Priority 2 | Frequency 3 |
|            |            | Frequency 4 |
|            |            | Frequency 5 |
| Slice 3 ID | Priority 3 | Frequency 1 |
| Slice 4 ID | Priority 4 | Frequency 1 |

(b) (One or more pieces of) frequency information, where each frequency corresponds to one or more pieces of slice information.

i. The slice information is carried in the SIB message in a form of bit, as shown in Table 4. Assuming that 4 bits are used to represent an ID of the slice, slice 1 may be represented as 0001, slice 2 is 0010, and so on.

Optionally, different priorities may be allocated to the slice information (as shown in the second column in Table 4).

TABLE 4

One-to-many relationship between frequency and slice in a form of bit

| Frequency 1 | Priority 1 | Slice 1 ID |
| | | Slice 2 ID |
| Frequency 2 | Priority 2 | Slice 3 ID |
| | | Slice 4 ID |
| | | Slice 5 ID |
| Frequency 3 | Priority 3 | Slice 6 ID |
| Frequency 4 | | Slice 7 ID | ii. The slice information is carried in the SIB message in a form of bitmap, as shown in Table 5. It is assumed that the cell supports a total of eight slices, and a bitmap is 0010 0110. "1" indicates that the slice is available, and "0" indicates that the slice is unavailable. In other words, for frequency 1, slice 3, slice 6, and slice 7 are available.

Optionally, different priorities may be allocated to the slice information (as shown in the third column in Table 5).

TABLE 5

One-to-many relationship between frequency and slice in a form of bitmap

| Frequency 1 | 0 (Slice 1) | Priority 1 |
| | 0 (Slice 2) | Priority 1 |
| | 1 (Slice 3) | Priority 1 |
| | 0 (Slice 4) | Priority 2 |
| | 0 (Slice 5) | Priority 2 |
| | 1 (Slice 6) | Priority 3 |
| | 1 (Slice 7) | Priority 4 |
| | 0 (Slice 8) | Priority 5 |

Step 3: The terminal device selects one slice to access based on types of slices and frequencies that can be supported by the terminal device and an available slice and priority (if any) of the current cell.

If a priority is set for the slice, the terminal device may select a slice with a highest priority to access from the slices that are supported by the terminal device and that are available to the cell.

Embodiment 2

A slice-based cell reselection process is described in Embodiment 2. In this embodiment, a terminal device receives a dedicated signal (dedicated signalling). Embodiment 2 includes the following steps.

Step 1: When performing cell reselection, the terminal device receives an RRC release message, where the RRC release message carries dedicated slice information of the terminal device.

Optionally, the dedicated slice information includes at least one of the following (a) to (c).
 (a) Information about a "reselected cell", such as an ID of the reselected cell.
 (b) Information about (one or more pieces of) slices in a "reselected cell" that can be camped on, where each slice corresponds to one or more pieces of frequency information. Optionally, the slice information may be carried in a form of bit/bitmap. Alternatively, as shown in Embodiment 1, to avoid repetition, details are not described herein again.
 (c) Information about (one or more pieces of) frequencies in a "reselected cell" that can be camped on, where each frequency corresponds to one or more pieces of slice information. Optionally, the slice information may be carried in a form of bit/bitmap. Alternatively, as shown in Embodiment 1, to avoid repetition, details are not described herein again.

Step 2: The terminal device selects one dedicated slice to access based on types of slices and frequencies that can be supported by the terminal device and an available slice and priority (if any) that can be supported by a current cell.

If a priority is set for the slice, the terminal device may select a slice with a highest priority to access from the slices that are supported by the terminal device and that are available to the cell. For a manner of setting the priority, refer to Embodiment 1.

The cell selection or reselection method according to embodiments of the present disclosure is described above with reference to FIG. 1. A cell selection or reselection method according to an embodiment of the present disclosure is described below with reference to FIG. 2. It may be understood that interaction between a network device and a terminal device described from a network device side is the same as that described on a terminal device side in the method shown in FIG. 1. To avoid repetition, related descriptions are appropriately omitted.

Figure 2:
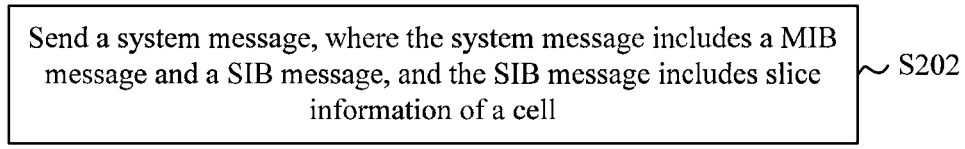
FIG. 2 is a schematic flowchart of a cell selection or reselection method according to another embodiment of the present disclosure.

FIG. 2 is a schematic flowchart of implementing a cell selection or reselection method according to an embodiment of the present disclosure, and the method may be applied to a network device side. As shown in FIG. 2, a method 200 includes the following steps.

S202: Send a system message, where the system message includes a MIB message and a SIB message, and the SIB message includes slice information of a cell.

The slice information of the cell is used by a terminal device to select one slice from slices of the cell to access based on slice information supported by the terminal device and the slice information of the cell.

The MIB message is used by the terminal device to determine whether the cell can be a candidate access cell.

In this embodiment of the present disclosure, a SIB message of a cell includes slice information of the cell. In a case of determining, based on the MIB message, that the cell can be a candidate access cell, a terminal device may read the SIB message, and select one slice from slices of the cell to access based on slice information supported by the terminal device and the slice information of the cell. In this embodiment of the present disclosure, the terminal device may directly select a slice that is supported by the terminal device and that is available to the cell to access, to effectively and rapidly access the cell.

Optionally, in an embodiment, in the MIB message, a cell status indicator of the cell is "not barred", and/or the MIB message includes an identifier of a slice supported by the terminal device.

Optionally, in an embodiment, the SIB message of the cell includes at least one of the following: one or more pieces of slice information of the cell, where one piece of slice information corresponds to one or more pieces of frequency information; and one or more pieces of frequency information of the cell, where one piece of frequency information corresponds to one or more pieces of slice information.

Optionally, in an embodiment, a priority is further set for the slice information of the cell.

Optionally, in an embodiment, the slice information of the cell is used by the terminal device to select one slice from slices of the cell based on the slice information supported by the terminal device, the slice information of the cell, and the priority corresponding to the slice information of the cell.

Optionally, in an embodiment, the method further includes: sending an RRC release message, where the RRC release message carries dedicated slice information of the terminal device, and the dedicated slice information is used by the terminal device to reselect a slice of the cell.

Optionally, in an embodiment, the dedicated slice information includes at least one of the following: information about a reselected cell; information about one or more slices in the reselected cell that can be camped on, where one piece of slice information corresponds to one or more pieces of frequency information; or information about one or more frequencies in the reselected cell that can be camped on, where one piece of frequency information corresponds to one or more pieces of slice information.

Optionally, in an embodiment, the slice information of the cell is carried in at least one of the following forms: being carried in a form of bit; or being carried in a form of bitmap. The slice information of the reselected cell is carried in at least one of the following forms: being carried in a form of bit; or being carried in a form of bitmap.

Optionally, in an embodiment, the frequency information includes at least one of the following: frequency information of a same radio access technology, or frequency information of different same radio access technologies.

The cell selection or reselection method according to embodiments of the present disclosure is described above with reference to FIG. 1 and FIG. 2. A terminal device according to an embodiment of the present disclosure is described below with reference to FIG. 3.

Figure 3:
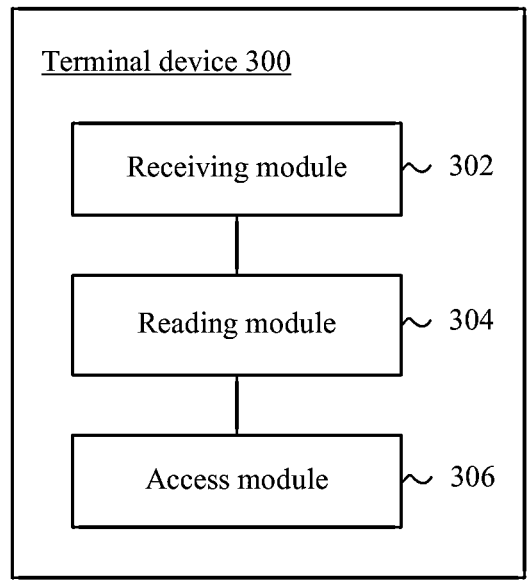
FIG. 3 is a schematic diagram of a structure of a terminal device according to an embodiment of the present disclosure.

FIG. 3 is a schematic diagram of a structure of a terminal device according to an embodiment of the present disclosure. As shown in FIG. 3, a terminal device 300 includes the following modules:

a receiving module 302, configured to receive a MIB message from a cell;

a reading module 304, configured to: in a case of determining, based on the MIB message, that the cell can be a candidate access cell, read a SIB message of the cell, where the SIB message includes slice information of the cell; and an access module 306, configured to select one slice from slices of the cell to access based on slice information supported by the terminal device and the slice information of the cell.

In this embodiment of the present disclosure, a SIB message of a cell includes slice information of the cell. In a case of determining, based on the MIB message, that the cell can be a candidate access cell, a terminal device may read the SIB message, and select one slice from slices of the cell to access based on slice information supported by the terminal device and the slice information of the cell. In this embodiment of the present disclosure, the terminal device may directly select a slice that is supported by the terminal device and that is available to the cell to access, to effectively and rapidly access the cell.

Optionally, in an embodiment, the reading module 304 may be configured to: in a case of determining that at least one of the following is satisfied, determine that the cell can be a candidate access cell; and determine, based on the MIB message, that a cell status indicator of the cell is "not barred", where the MIB message includes an identifier of a slice supported by the terminal device.

Optionally, in an embodiment, the SIB message of the cell includes at least one of the following: one or more pieces of slice information of the cell, where one piece of slice information corresponds to one or more pieces of frequency information; and one or more pieces of frequency information of the cell, where one piece of frequency information corresponds to one or more pieces of slice information.

Optionally, in an embodiment, a priority is further set for the slice information of the cell.

Optionally, in an embodiment, the access module 306 may be configured to: select one slice from the slices of the cell to access based on the slice information supported by the terminal device, the slice information of the cell, and the priority corresponding to the slice information of the cell.

Optionally, in an embodiment, the receiving module 302 may be configured to receive a radio resource control RRC release message. The access module 306 may be configured to: if the RRC release message carries dedicated slice information of the terminal device, reselect a slice of the cell based on the dedicated slice information.

Optionally, in an embodiment, the dedicated slice information includes at least one of the following: information about a reselected cell; information about one or more slices in the reselected cell that can be camped on, where one piece of slice information corresponds to one or more pieces of frequency information; or information about one or more frequencies in the reselected cell that can be camped on, where one piece of frequency information corresponds to one or more pieces of slice information.

Optionally, in an embodiment, the slice information of the cell is carried in at least one of the following forms: being carried in a form of bit; or being carried in a form of bitmap. The slice information of the reselected cell is carried in at least one of the following forms: being carried in a form of bit; or being carried in a form of bitmap.

Optionally, in an embodiment, the frequency information includes at least one of the following: frequency information of a same radio access technology, or frequency information of different same radio access technologies.

For the terminal device 300 in this embodiment of the present disclosure, reference may be made to a procedure corresponding to the method 100 in the embodiments of the present disclosure. In addition, units/modules in the terminal device 300 and other operations and/or functions are respectively used to implement corresponding procedures in the method 100, and a same or equivalent technical effect can be achieved. For brevity, details are not described herein again.

Figure 4:
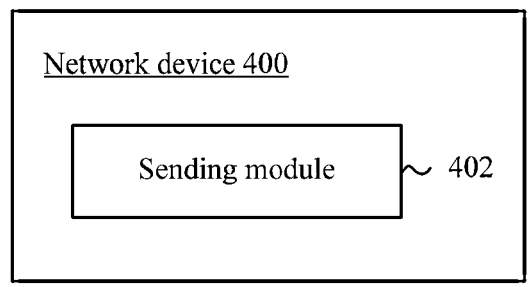
FIG. 4 is a schematic diagram of a structure of a network device according to an embodiment of the present disclosure.

FIG. 4 is a schematic diagram of a structure of a network device according to an embodiment of the present disclosure. As shown in FIG. 4, a network device 400 includes the following modules:

a sending module 402, configured to: send a system message, where the system message includes a MIB message and a SIB message, and the SIB message includes slice information of a cell; where the slice information of the cell is used by a terminal device to select one slice from slices of the cell to access based on slice information supported by the terminal device and the slice information of the cell.

In this embodiment of the present disclosure, a SIB message of a cell includes slice information of the cell. In a case of determining, based on the MIB message, that the cell can be a candidate access cell, a terminal device may read the SIB message, and select one slice from slices of the cell to access based on slice information supported by the terminal device and the slice information of the cell. In this embodiment of the present disclosure, the terminal device may directly select a slice that is supported by the terminal device and that is available to the cell to access, to effectively and rapidly access the cell.

Optionally, in an embodiment, in the MIB message, a cell status indicator of the cell is "not barred", and/or the MIB message includes an identifier of a slice supported by the terminal device.

Optionally, in an embodiment, the SIB message of the cell includes at least one of the following: one or more pieces of slice information of the cell, where one piece of slice information corresponds to one or more pieces of frequency information; and one or more pieces of frequency information of the cell, where one piece of frequency information corresponds to one or more pieces of slice information.

Optionally, in an embodiment, a priority is further set for the slice information of the cell.

Optionally, in an embodiment, the slice information of the cell is used by the terminal device to select one slice from slices of the cell based on the slice information supported by the terminal device, the slice information of the cell, and the priority corresponding to the slice information of the cell.

Optionally, in an embodiment, the sending module 402 may be configured to: send an RRC release message, where the RRC release message carries dedicated slice information of the terminal device, and the dedicated slice information is used by the terminal device to reselect a slice of the cell.

Optionally, in an embodiment, the dedicated slice information includes at least one of the following: information about a reselected cell; information about one or more slices in the reselected cell that can be camped on, where one piece of slice information corresponds to one or more pieces of frequency information; or information about one or more frequencies in the reselected cell that can be camped on, where one piece of frequency information corresponds to one or more pieces of slice information.

Optionally, in an embodiment, the slice information of the cell is carried in at least one of the following forms: being carried in a form of bit; or being carried in a form of bitmap. The slice information of the reselected cell is carried in at least one of the following forms: being carried in a form of bit; or being carried in a form of bitmap.

Optionally, in an embodiment, the frequency information includes at least one of the following: frequency information of a same radio access technology, or frequency information of different same radio access technologies.

For the network device 400 in this embodiment of the present disclosure, reference may be made to a procedure corresponding to the method 200 in the embodiments of the present disclosure. In addition, units/modules in the network device 400 and other operations and/or functions are respectively used to implement corresponding procedures in the method 200, and a same or equivalent technical effect can be achieved. For brevity, details are not described herein again.

The embodiments in this specification are described in a progressive manner. Each embodiment focuses on a difference from another embodiment, and for a same or similar part of the embodiments, reference may be made to each other. For a device embodiment, because the device embodiment is basically similar to the method embodiment, the device embodiment is described relatively simply. For related parts, refer to partial descriptions of the method embodiment.

Figure 5:
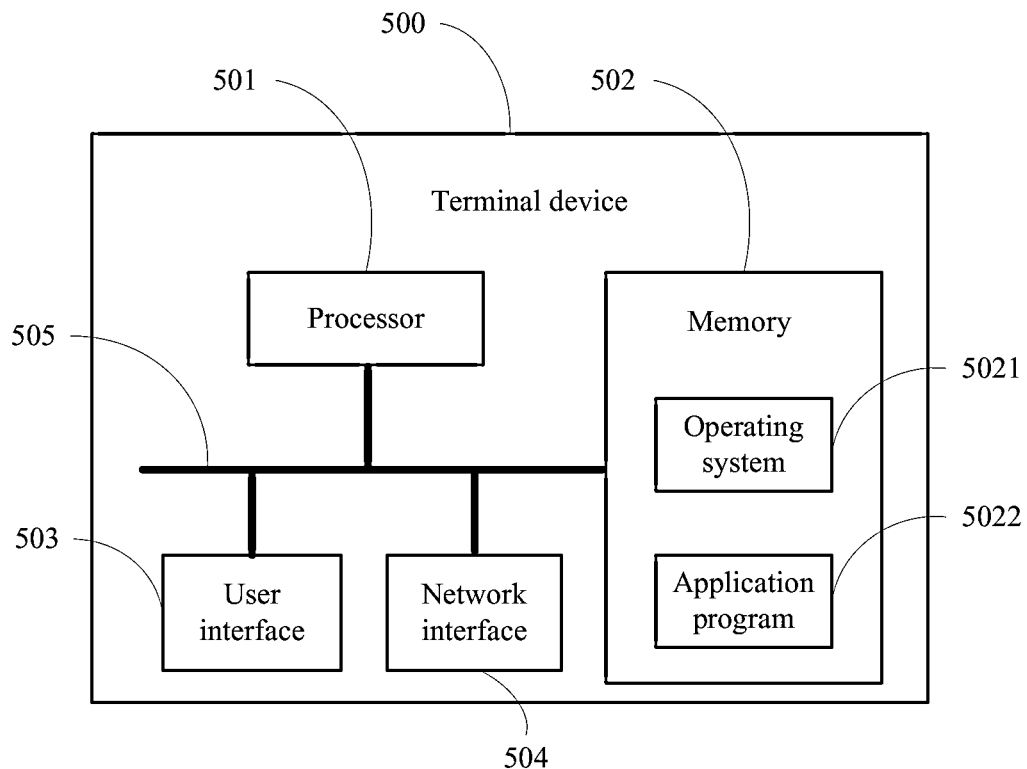
FIG. 5 is a schematic diagram of a structure of a terminal device according to another embodiment of the present disclosure.

FIG. 5 is a block diagram of a terminal device according to another embodiment of the present disclosure. A terminal device 500 shown in FIG. 5 includes at least one processor 501, a memory 502, at least one network interface 504, and a user interface 503. Components in the terminal device 500 are coupled together by using a bus system 505. It may be understood that the bus system 505 is configured to implement connection and communication between these components. In addition to a data bus, the bus system 505 further includes a power bus, a control bus, and a status signal bus. However, for clear description, various buses are marked as the bus system 505 in FIG. 5.

The user interface 503 may include a display, a keyboard, or a click device (for example, a mouse, a trackball (trackball), a touchpad, or a touchscreen).

It may be understood that the memory 502 in this embodiment of the present disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example instead of limitation, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 502 of the system and method described in the embodiments of the present disclosure is intended to include but is not limited to these and any other suitable type of memory.

In some implementations, the memory 502 stores the following elements: an executable module or a data structure, or a subset thereof, or an extension set thereof: an operating system 5021 and an application program 5022.

The operating system 5021 includes various system programs, such as a framework layer, a kernel layer, and a drive layer, and is configured to implement various basic services and process hardware-based tasks. The application program 5022 includes various application programs, such as a media player (Media Player) and a browser (Browser), and is configured to implement various application services. A program for implementing the method in this embodiment of the present disclosure may be included in the application program 5022.

In this embodiment of the present disclosure, the terminal device 500 further includes a computer program that is stored in the memory 502 and that can run on the processor 501. When the computer program is executed by the processor 501, steps in the method embodiment 100 are implemented.

The foregoing method disclosed in the embodiments of the present disclosure may be applied to the processor 501, or implemented by the processor 501. The processor 501 may be an integrated circuit chip, and has a signal processing capability. In an implementation process, the steps in the foregoing methods may be completed by using an integrated logic circuit of hardware in the processor 501 or an instruction in a form of software. The foregoing processor 501 may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The methods, steps, and logical block diagrams disclosed in the embodiments of the present disclosure may be implemented or executed. The general purpose processor may be a microprocessor, or the processor may be any conventional processor or the like. The steps of the method disclosed with reference to the embodiments of the present disclosure may be directly performed by a hardware decoding processor, or may be performed by using a combination of hardware and software modules in a decoding processor. The software module may be located in a computer-readable storage medium that is mature in the art, such as a random access memory, a flash memory, a read-only memory, a programmable read-only memory, an electrically erasable programmable memory, or a register. The computer-readable storage medium is located in the memory 502. The processor 501 reads information in the memory 502 and completes the steps of the foregoing methods in combination with the hardware of the processor 501. Alternatively, the computer-readable storage medium stores a computer program. When the computer program is executed by the processor 501, steps in the foregoing method embodiment 100 are implemented.

It may be understood that the embodiments described in the embodiments of the present disclosure may be implemented by hardware, software, firmware, middleware, microcode, or a combination thereof. For hardware implementation, the processing unit may be implemented in one or more application specific integrated circuits (Application Specific Integrated Circuits, ASIC), a digital signal processor (Digital Signal Processor, DSP), a digital signal processing device (DSP Device, DSPD), a programmable logic device (Programmable Logic Device, PLD), a field-programmable gate array (Field-Programmable Gate Array, FPGA), a general purpose processor, a controller, a microcontroller, a microprocessor, another electronic unit configured to perform the functions described in this application, or a combination thereof.

For software implementations, the techniques described in the embodiments of the present disclosure may be implemented by modules (for example, processes and functions) that perform the functions described in the embodiments of the present disclosure. The software code may be stored in a memory and executed by a processor. The memory may be implemented in or outside the processor.

The terminal device 500 can implement processes implemented by the terminal device in the foregoing embodiments, and can achieve a same or equivalent technical effect. To avoid repetition, details are not described herein again.

Figure 6:
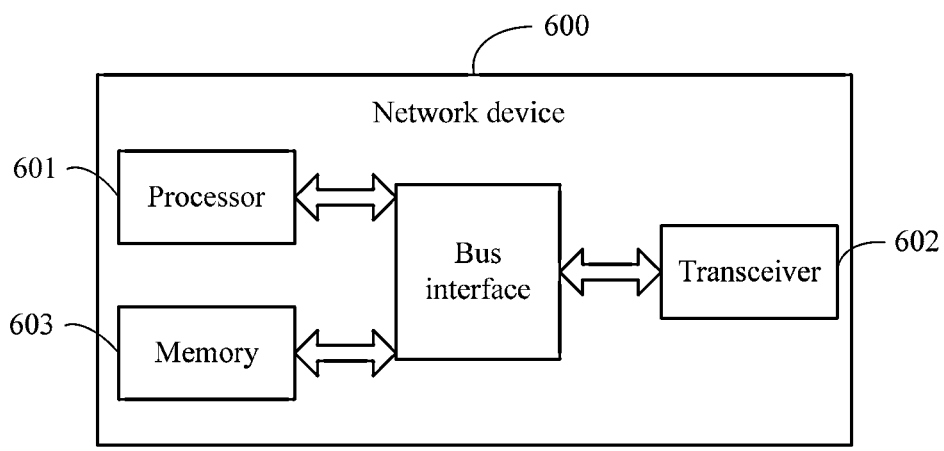
FIG. 6 is a schematic diagram of a structure of a network device according to another embodiment of the present disclosure.

As shown in FIG. 6, FIG. 6 is a diagram of a structure of a network device to which an embodiment of the present disclosure is applied. The network device can implement details in the method embodiment 200, and achieve a same effect. As shown in FIG. 6, a network device 600 includes a processor 601, a transceiver 602, a memory 603, and a bus interface.

In this embodiment of the present disclosure, the network device 600 further includes a computer program that is stored in the memory 603 and that can run on the processor 601. When the computer program is executed by the processor 601, steps in the method embodiment 200 are implemented.

In FIG. 6, a bus architecture may include any quantity of interconnected buses and bridges, and is linked by various circuits of one or more processors represented by the processor 601 and a memory represented by the memory 603. The bus architecture may further link various other circuits such as a peripheral device, a voltage regulator, and a power management circuit together. These are all well-known in the art, and therefore are not further described in this specification. The bus interface provides interfaces. The transceiver 602 may be multiple elements, in other words, includes a transmitter and a receiver, and provides a unit configured to communicate with various other apparatuses on a transmission medium.

The processor 601 is responsible for managing the bus architecture and common processing, and the memory 603 may store data used when the processor 601 performs an operation.

An embodiment of the present disclosure further provides a computer-readable storage medium. A computer program is stored in the computer-readable storage medium. When the computer program is executed by a processor, processes of either of the foregoing method embodiment 100 and method embodiment 200 are implemented, and a same technical effect can be achieved. To avoid repetition, details are not described herein. The computer-readable storage medium includes a read-only memory (Read-Only Memory, ROM for short), a random access memory (Random Access Memory, RAM for short), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A cell selection or reselection method performed by a terminal device, comprising:
receiving a master information block (MIB) message from a cell;
in a case of determining, based on the MIB message, that the cell can be a candidate access cell, reading a system information block (SIB) message of the cell, wherein the SIB message comprises slice information of the cell; and
selecting one slice from slices of the cell to access based on slice information supported by the terminal device and the slice information of the cell;
wherein the determining, based on the MIB message, that the cell can be a candidate access cell comprises:
determining, in a case where the MIB message comprises an identifier of a slice supported by the terminal device, that the cell can be a candidate access cell;
giving up, in a case where the MIB message does not comprise an identifier of a slice supported by the terminal device, reading the SIB message.

2. The method according to claim 1, wherein the determining, based on the MIB message, that the cell can be a candidate access cell comprises: in a case where it is determined, based on the MIB message, that a cell status indicator of the cell is "not barred", determining that the cell can be a candidate access cell.

3. The method according to claim 1, wherein the SIB message of the cell comprises at least one of the following:
one or more pieces of slice information of the cell, wherein one piece of slice information corresponds to one or more pieces of frequency information; or
one or more pieces of frequency information of the cell, wherein one piece of frequency information corresponds to one or more pieces of slice information.

4. The method according to claim 1, wherein a priority is further set for the slice information of the cell.

5. The method according to claim 4, wherein the selecting one slice from slices of the cell to access based on slice information supported by the terminal device and the slice information of the cell comprises:
selecting one slice from the slices of the cell to access based on the slice information supported by the terminal device, the slice information of the cell, and the priority corresponding to the slice information of the cell.

6. The method according to claim 1, wherein the method further comprises:
receiving a radio resource control (RRC) release message; and
in a case that the RRC release message carries dedicated slice information of the terminal device, reselecting a slice of the cell based on the dedicated slice information.

7. The method according to claim 6, wherein the dedicated slice information comprises at least one of the following:
information about a reselected cell;
information about one or more slices in the reselected cell that can be camped on, wherein one piece of slice information corresponds to one or more pieces of frequency information; or
information about one or more frequencies in the reselected cell that can be camped on, wherein one piece of frequency information corresponds to one or more pieces of slice information.

8. The method according to claim 3, wherein
the slice information of the cell is carried in at least one of the following forms: being carried in a form of bit, and being carried in a form of bitmap; and
the slice information of the reselected cell is carried in at least one of the following forms:
being carried in a form of bit, and being carried in a form of bitmap.

9. The method according to claim 3, wherein the frequency information comprises at least one of the following:
frequency information of a same radio access technology; or
frequency information of different radio access technologies.

10. A cell selection or reselection method performed by a network device, comprising:
sending a system message, wherein the system message comprises a master information block (MIB) message and a system information block (SIB) message, the MIB message comprises an identifier of a slice supported by the terminal device, and the SIB message comprises slice information of a cell; wherein the slice information of the cell is used by the terminal device to select one slice from slices of the cell to access based on slice information supported by the terminal device and the slice information of the cell, wherein the terminal device gives up, in a case where the MIB message does not comprise an identifier of a slice supported by the terminal device, reading the SIB message.

11. The method according to claim 10, wherein
a cell status indicator of the cell in the MIB message is "not barred"; and the MIB message comprises an identifier of a slice supported by the terminal device; or
a cell status indicator of the cell in the MIB message is "not barred".

12. The method according to claim 10, wherein the SIB message of the cell comprises at least one of the following:
one or more pieces of slice information of the cell, wherein one piece of slice information corresponds to one or more pieces of frequency information; or
one or more pieces of frequency information of the cell, wherein one piece of frequency information corresponds to one or more pieces of slice information.

13. The method according to claim 10, wherein a priority is further set for the slice information of the cell.

14. The method according to claim 13, wherein the slice information of the cell is used by the terminal device to select one slice from the slices of the cell to access based on slice information supported by the terminal device, the slice information of the cell, and the priority corresponding to the slice information of the cell.

15. The method according to claim 10, wherein the method further comprises:
sending a radio resource control (RRC) release message; wherein
the RRC release message carries dedicated slice information of the terminal device, and the dedicated slice information is used by the terminal device to reselect a slice of the cell.

16. The method according to claim 15, wherein the dedicated slice information comprises at least one of the following:

information about a reselected cell;

information about one or more slices in the reselected cell that can be camped on, wherein one piece of slice information corresponds to one or more pieces of frequency information; or information about one or more frequencies in the reselected cell that can be camped on, wherein one piece of frequency information corresponds to one or more pieces of slice information.

17. The method according to claim 12, wherein the slice information of the cell is carried in at least one of the following forms: being carried in a form of bit, and being carried in a form of bitmap; and the slice information of the reselected cell is carried in at least one of the following forms: being carried in a form of bit, and being carried in a form of bitmap.

18. The method according to claim 12, wherein the frequency information comprises at least one of the following:

frequency information of a same radio access technology; or frequency information of different radio access technologies.

19. A terminal device, comprising:

a processor; and a memory storing a computer program that is executable on the processor, wherein the computer program, when executed by the processor, causes the terminal device to perform the following steps:

receiving a master information block (MIB) message from a cell;

in a case of determining, based on the MIB message, that the cell can be a candidate access cell, reading a system information block (SIB) message of the cell, wherein the SIB message comprises slice information of the cell; and selecting one slice from slices of the cell to access based on slice information supported by the terminal device and the slice information of the cell;

wherein the determining, based on the MIB message, that the cell can be a candidate access cell comprises:

determining, in a case where the MIB message comprises an identifier of a slice supported by the terminal device, that the cell can be a candidate access cell;

giving up, in a case where the MIB message does not comprise an identifier of a slice supported by the terminal device, reading the SIB message.

20. A network device, comprising:

a processor; and a memory storing a computer program that is executable on the processor, wherein the computer program, when executed by the processor, causes the network device to perform steps in the cell selection or reselection method according to claim 10.

* * * * *